INVENTOR
JOHN P. FRANZE

United States Patent Office 3,394,210
Patented July 23, 1968

3,394,210
METHOD OF MAKING A CELLULAR THERMO-PLASTIC VINYL RESIN SHEET MATERIAL
John P. Franze, Lancaster County, Pa., assignor to Armstrong Cork Company, Lancaster, Pa., a corporation of Pennsylvania
Filed July 2, 1965, Ser. No. 469,282
4 Claims. (Cl. 264—47)

ABSTRACT OF THE DISCLOSURE

A method for producing a decorative thermoplastic vinyl resin sheet having a plurality of distinct layers including at least one cellular layer wherein several layers of a free-flowing thermoplastic vinyl resin mix are layed up on a carrier, at least one layer containing a blowing agent, the layers heated to a temperature at which the resin particles fuse and become substantially fluid and at which the blowing agent decomposes, and the layers extruded between a carrier and a consolidating roll.

---

This invention relates generally to a method of making a foamed thermoplastic vinyl resin sheet material and is more particularly directed to a method of forming a foamed vinyl chloride-containing resin sheet material from a free-flowing particulate mix.

Plastic foams heretofore made from vinyl chloride-type resins have been conventionally made by utilizing the vinyl resin in the form of a plastisol in which a chemical blowing agent is incorporated in the fluid plastisol. In one method the resultant fluid plastisol having a chemical blowing agent incorporated therein is poured into a mold and blown or expanded into its final shape by the application of heat and, in a second method, the plastic foam is made in a continuous fashion by metering a fluid plastisol containing blowing agent onto a continuous belt prior to fusing. In both methods relatively expensive raw materials are required and it is difficult, by these techniques, to control the gauge of the final foamed product and it is also difficult to fuse open-celled foam products produced by the latter technique.

Another process of forming a plastic foam utilizes a thermoplastic resin composition containing a blowing agent which is solid at ordinary temperatures. In this process the resin is milled with the blowing agent to form a unitary solid mass of resin and blowing agent. The milled mass is then calendered under such conditions that the resin becomes fused into a continuous film or sheet and the film thus formed is heated to a temperature in excess of the decomposition temperature of the blowing agent to form the foamed sheet material. This method forms an essentially closed-cell system having an outer surface or skin which is essentially continuous on both sides. This method requires expensive equipment and the speed of production is limited. The formation of an open-cell foam is difficult since it is necessary to overblow after the strength of the cells are fully developed in the fused material.

A principal object of this invention is to provide a method for forming a foamed thermoplastic vinyl resin sheet material in a continuous manner from relatively inexpensive resins using minimal equipment.

Another object of this invention is to provide a method which will have the added advantage in that the cellular foam produced may be either of a closed-cell structure or of an open-cell structure, depending upon the conditions of manufacture. Where an open-cell foam is desired, it is an object to provide a method which will not result in overblowing but which will give a product having a readily controllable cell size.

Still a further object of this invention is to provide a method whereby the foamed sheet material is formed from a free-flowing particulate thermoplastic vinyl resin mix which, when processed in accordance with the invention, will result in a foamed cellular product having a relatively low heat history, thus requiring less stabilizer in processing than a calendered composition.

These and other objects of this invention will become more obvious from the description which follows when taken with reference to the accompanying drawings, wherein.

Figure 1:
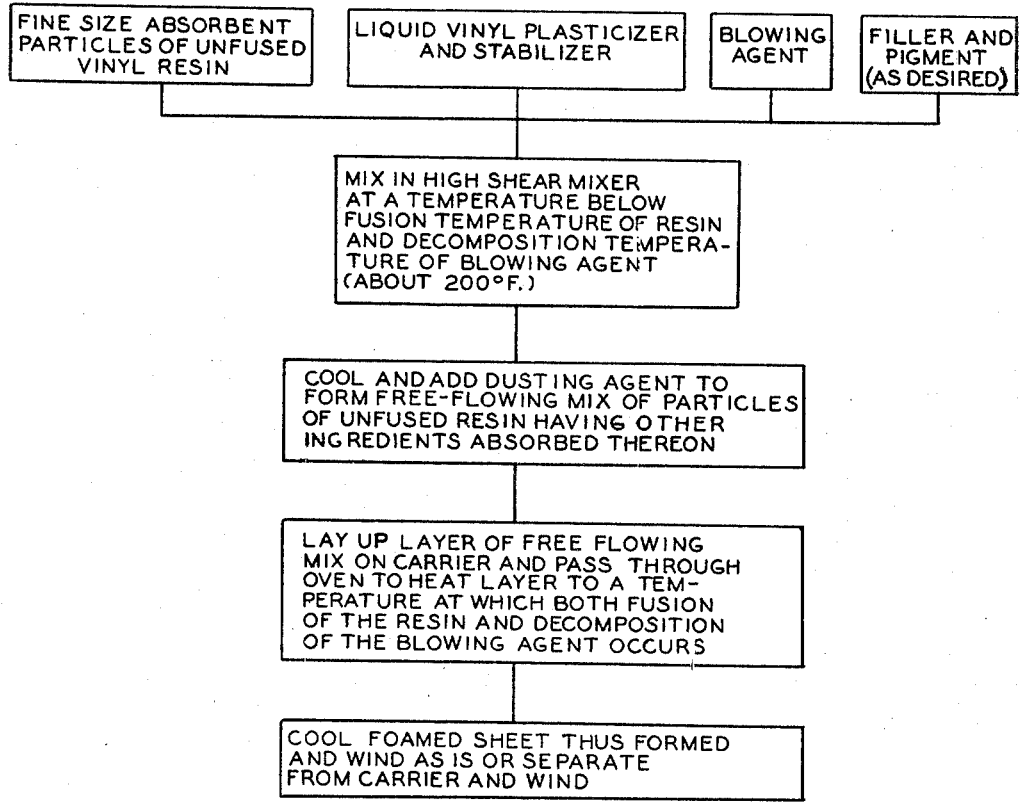
FIGURE 1 is a flow diagram representing the practice of the invention.

I have succeeded in forming a foamed cellular vinyl resin sheet material which is homogeneously fused throughout by laying up, on a suitable carrier, a layer of a free-flowing vinyl resin mix. The vinyl resin mix is comprised of unfused resin particles having liquid stabilizer and plasticizer diffused through the resin and having the required blowing agent, pigment, and filler absorbed thereon. The layer of the free-flowing vinyl resin mix, on the carrier, is heated to substantially simultaneously fuse the resin components and to decompose the blowing agent and thus form the cellular thermoplastic resin sheet which is then cooled and either stripped from the carrier or rolled with the carrier.

It has been found that the carrier may either be porous or non-porous and suitable carriers include paper, felt, release paper, and steel belts. The nature of the carrier is not critical to the practice of this invention although, obviously, it must be of a material which will not decompose during the process used in forming the cellular thermoplastic sheet material.

The free-flowing mix of resin, plasticizer, stabilizer, blowing agent, pigment and filler may be readily formed by adding the resin, for example a homopolymer of vinyl chloride, in the form of discrete particles, along with the vinyl resin plasticizer such as di(2-ethyl hexyl) phthalate, butyl benzyl phthalate, epoxidized soybean oil, or tricresyl phosphate, the blowing agent, filler, and pigment, and suitable vinyl resin stabilizers to a mixer or blender such as a Henschel blender where they are mixed under moderate heat, for instance at a temperature of about 200° F., for a period of time to ensure that the liquid plasticizer and stabilizer become absorbed and thus diffused throughout the resin particles and the remaining ingredients adsorbed thereon. Care is taken so that no fusion of the resin particles occurs during the mixing and the temperatures must be kept below the point at which such fusion would occur. The mix thus formed is commonly referred to as a vinyl dry blend and is in the form of a free-flowing homogeneous mixture of unfused thermoplastic vinyl resin particles, liquid vinyl plasticizers, blowing agent, filler, pigment, and vinyl stabilizer.

Generally speaking, the addition of fillers and pigments to the mix may be made either initially, at the end of the mixing cycle when the resin particles remain relatively warm, or after the dry blended resin particles have been mixed and cooled.

The particles of thermoplastic vinyl resin used in practicing the invention have a relatively large surface area and are generally porous in nature such that they will readily absorb the liquid plasticizer and/or liquid stabilizer, i.e. the liquid components will readily diffuse through the resin. As a resin, I prefer particles of a vinyl chloride homopolymer prepared by suspension polymerization. I prefer using resins having a specific viscosity in the range of about 0.15 to 0.6 as determined by the A.S.T.M. Specification D–1243–54 method.

Preferably, I use a liquid vinyl stabilizer such as a calcium-zinc soap but solid stabilizers such as cadmium laurates may also be used. It has been found that certain stabilizers tend to inhibit blowing and, for this reason, I prefer not to use stabilizers such as barium soaps in the stabilizer system when practicing this invention.

Based on 100 parts by weight resin, about 20 to 125 parts by weight plasticizer, 2 to 6 parts by weight stabilizer, 0.5 to 7 parts by weight blowing agent and 0 to 50 parts by weight filler and pigment may be used in forming the free-flowing mix.

In order that the invention may be readily understood, certain embodiments of the method will be described in conjunction with the attached drawings.

PREPARATION OF PLASTICIZED VINYL DRY BLENDS

Example 1

The following formula provides a composition suitable for use as the free-flowing thermoplastic vinyl resin mix, all parts being given by weight:

Ingredients: Parts by weight
Polyvinyl chloride homopolymer (Specific viscosity 0.38 [1]) _____ 100
Di(2-ethyl hexyl) phthalate _____ 70
Epoxidized soybean oil (Admex 710) _____ 5
Calcium-zinc-phosphorous 2-ethyl hexanoate __ 4
Liquid zinc activator (Advance ABCl) _____ 3.5
Titanium dioxide pigment _____ 5
Limestone (50 mesh) _____ 19
Limestone (325 mesh) _____ 2
Azodicarbonamide (Kempore 60) _____ 2

[1] The specific viscosities reported in the examples were determined in accordance with A.S.T.M. D–1243–54 Method B.

The resin, stabilizers, activator, pigment, blowing agent, and one-half the di(2-ethyl hexyl) phthalate) are added to a Henschel blender and mixed until approximately 160° F. is reached. The remaining half of the plasticizer is added and mixing continued until 210° F. is reached. The limestone is added, mixing is continued for one minute, and the batch is cooled to 110° F. At this point the finely ground limestone is added as a dusting agent to make the blend more free flowing. After cooling to 90° F. the batch is discharged, sifted, and is ready for use.

SHEET FORMATION

Figure 2:
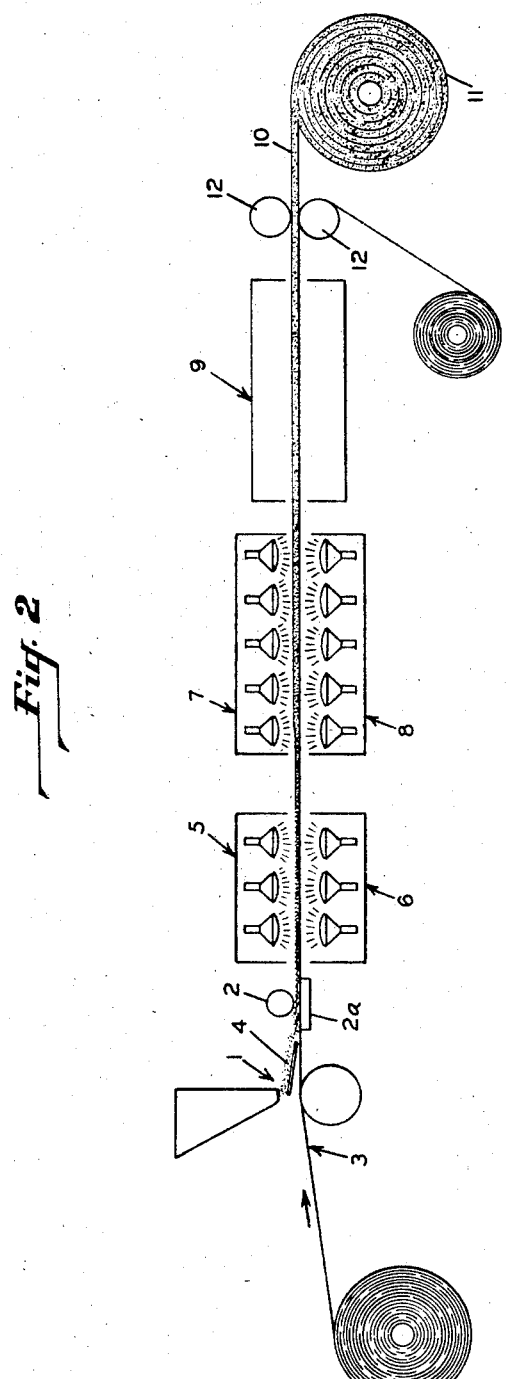
FIGURE 2 is a diagrammatic representation of one arrangement of apparatus used for carrying out the invention.

In forming the fused foamed vinyl resin sheet in accordance with the invention and with reference to the drawing, a layer of the free-flowing thermoplastic vinyl resin mix 4 formed in accordance with Example 1 is fed onto a suitable carrier 3, as shown in FIGURE 2, by means of a suitable feeding mechanism, such as the hopper and chute arrangement shown at 1. The mix passes beneath an 8″ diameter steel, reverse metering roll 2 which revolves in a direction counter to the direction of the carrier 3 and is adjustable to give the desired metered amount of vinyl resin mix layup on the carrier 3. A steel plate 2a is positioned beneath the roll 2 and the nip formed by the roll 2 and plate 2a determines the thickness of mix laid up on carrier 3. The carrier 3 is an oleoresinous saturated rag felt having a methyl cellulose release coating on the side onto which the mix is fed. The mix 4 in the form of a continuous layer .120″ in thickness is carried by the carrier 3 to a preheater comprised of two banks of radiant heaters 5 and 6 and in which considerable bottom heat is used in order to fuse the bottom of the vinyl resin layer prior to the fusion and foaming cycle. The layer of free-flowing thermoplastic vinyl resin mix 4 is heated in the preheater to from 315° F. to 325° F., the time of preheating being about 50 seconds, and is then carried by the carrier to a second heater comprised of two more banks of radiant heaters, 7 and 8, where the layer is heated to 375° F. for 45 seconds and wherein the resin is thus substantially simultaneously fused while sufficient heat is being applied to also decompose the blowing agent and to liberate gas into the fusing resin mass, thus forming the foamed plastic layer. This foamed plastic layer on the carrier is then carried through a cooling tunnel 9 after which the foamed thermoplastic vinyl resin sheet is stripped from the carrier sheet at 10 and wound at 11. By way of illustration, driven rolls, such as those illustrated at 12, may be used to drive the carrier sheet through the equipment. The foamed thermoplastic sheet material thus formed is a uniform, white foam having an open cellular structure and is approximately .125″ in thickness, having a density of about 24 pounds per cubic foot.

Because the two heating cycles are different in duration, and because in the method of sheet formation illustrated the process is continuous, the time limit for the given heating cycle is determined by the speed of the carrier and the length of the tunnel formed by the two banks of radiant burners. It is quite obvious that the length of the tunnels, or the number of burners operative in a given tunnel, can be adjusted to vary the time and that generally it is preferred to use gas fired or electrical radiant heaters for the heating tunnels although it is also possible to use a circulating hot air oven, however the times required would be longer for this type of heating in order to bring the mix up to the desired temperatures and such a system would not prove as flexible.

Example 2

Ingredients: Parts by weight
Polyvinyl chloride homopolymer (specific viscosity 0.38) _____ 100
Di(2-ethyl hexyl) phthalate _____ 40
Butyl benzyl phthalate _____ 30
Epoxidized soybean oil (Admex 710) _____ 5
Calcium-zinc-phosphorous 2-ethyl hexanoate __ 4
Azodicarbonamide (Kempore 200) _____ 2
Titanium dioxide _____ 5
Limestone (50 mesh) _____ 19
Limestone (325 mesh) _____ 2

The vinyl dry blend composition was prepared from the above-described mixture of ingredients in the same manner as described under Example 1. Again, the layer of vinyl dry blend mix was laid up to a thickness of 0.120 inch on the carrier sheet, in this instance a beater saturated asbestos fiber rubber felt, as described in the sheet formation description carried under Example 1. In this instance the preheat was for 45 seconds at 315–325° F. and the material was fused and blown in the second group of heaters for 90 seconds at 350–375° F. A closed cellular thermoplastic vinyl foam sheet material was formed having a thickness of about 0.125 inch and a density of about 24 pounds per cubic foot.

The following examples illustrate the ability to make a low density foam (9 lb./cu. ft.) in the method and using the same carrier illustrated in Example 1.

Example 3

Ingredients: Parts by weight
Polyvinyl chloride homopolymer (Specific viscosity 0.28) _____ 100
Di(2-ethyl hexyl) phthalate _____ 25
1,3 butylene adipate _____ 25
Epoxidized soybean oil (Admex 710 _____ 5
Calcium-zinc-phosphorous 2-ethyl hexanoate __ 4
Azodicarbonamide (Kempore 200 _____ 5

The conditions for blowing this dry blend are: first preheat, 90 seconds at 300–320° F., second heater 150 seconds at 350–375° F. A somewhat lower plasticizer level is used as well as a polymeric plasticizer of rather poor efficiency. Also a much longer dwell time is necessary. All conditions are designed to permit complete expansion of the material without premature loss of gas which might result if the hot mass became too fluid during the blowing cycle. The original layup is to a thickness of about 0.045" and the final gauge of the foam is about 0.125".

Example 4

| Ingredients: | Parts by weight |
|---|---|
| Polyvinyl chloride homopolymer (Specific viscosity 0.56) | 100 |
| Di(2-ethyl hexyl) phthalate | 80 |
| Butyl benzyl phthalate | 10 |
| Epoxidized soybean oil (Admex 710) | 5 |
| Calcium-zinc-phosphorous 2-ethyl hexanoate | 4 |
| Azodicarbonamide (Kempore 60) | 2.6 |
| Titanium dioxide | 5 |
| Limestone (50 mesh) | 19 |
| Limestone (325 mesh) | 2 |

The conditions for blowing this dry blend are: first preheat, 50 seconds at 315–325° F., second heater, 120 seconds at 350–375° F. This dry blend makes use of a high viscosity resin and, using a release coated rubber-asbestos felt, results in an open celled foam. It is believed that the use of radiant heaters for heating and the somewhat higher plasticizer level permit the making of this type foam. The thickness of the original layup is 0.045" with the final foam gauge being 0.125" and the density being 9 lb./cu. ft.

The following example illustrates a method for forming a consolidated thermoplastic sheet material from a plurality of dry blend layers in which one of the layers forms a cellular foamed layer.

Example 5

| Ingredients: | Parts by weight |
|---|---|
| Decorative wear layer: | |
| Polyvinyl chloride homopolymer (Specify viscosity 0.349) | 100 |
| Di(2-ethyl hexyl) phthalate | 20 |
| Epoxidized soybean oil | 10 |
| Barium-cadmium-zinc phosphite | 4 |
| Natural pearl flakes | 0.5 |
| Opaque backing layer: | |
| Polyvinyl chloride homopolymer (Specific viscosity 0.349) | 100 |
| Di(2-ethyl hexyl) phthalate | 20 |
| Epoxidized soybean oil | 10 |
| Barium-cadmium-zinc phosphite | 4 |
| Pigments— | |
| Carbon black | 2.75 |
| Titanium dioxide | 2.75 |
| Foam backing layer: | |
| Polyvinyl chloride homopolymer (Specific viscosity 0.349) | 100 |
| Di(2-ethyl hexyl) phthalate | 20 |
| Epoxidized soybean oil | 10 |
| Barium-cadmium-zinc phosphite | 4 |
| Blowing agent (60% azodicarbonamide-40% dioctyl phthalate) | 0.8 |

The dry blends of the several ingredients used for forming each layer were respectively formed by adding the dry ingredients to a Henschel mixer which was run at a slow speed during the addition of the liquid ingredients. These were added slowly and on completion of the addition of the liquid ingredients the mixer was run at a high speed until a temperature of 200° F. was reached. Mixing was continued at 200° F. for about 2 minutes, after which the dry blend was cooled to 120° F. before being removed from the mixer.

Dry blend layers thus formed from the foam backing composition, opaque backing composition, and decorative wear layer composition were consecutively deposited on a steel belt at rates of about .090 lb./ft.², .150 lb./ft.², and .180 lb./ft.², respectively, to form three distinct layers. The three layers of dry blend composition were then heated to about 375° F. to fuse the resin and to decompose the blowing agent. At this point the three layers were in a substantially fluid state and they were immediately extruded between the steel belt and a consolidator roll. The integral vinyl sheet thus formed was cooled and removed from the steel belt. The sheet had a decorative wear layer 0.015" thick, an 0.025" thick opaque backing (intermediary) layer, and a rigid foam backing 0.040" thick of a closed cellular structure.

Generally speaking, the choice of resin and plasticizer determines the physical properties which result in the foam and whether open or closed cells are developed in the process. Where a medium solvating plasticizer at a relatively high over-all percentage is used, a very flexible foam with an open cellular structure is produced. Where an open cell structure is desired, the activator is selected to initiate blowing at a lower temperature and before fusion of the resin advances too far. Thus open cells can be made more easily with less heat and dwell time.

When it is desired to form an open cellular foamed structure, the blowing agent is selected which has the largest particle size since this decomposes over a broader temperature range. For instance, where azodicarbonamide is used as described above, it is supplied in three grades which are based upon particle size. The other grades may be used to form open cellular material if desired, adjustments being made in the other ingredients to give a lower rate of flow or fusion under heat.

The choice of viscosity of the resin, type and amount of plasticizer, and the amount, type, and the percent decomposition of the blowing agent generally controls the density of the final product. The thickness of original dry blend layup and the amount, type, and percent decomposition of the blowing agent governs the final gauge.

Since the foam would ordinarily be of a light yellow color because of the color developed by the blowing agent, white pigment is included in the formulations above described to produce a uniform, white foam. The color could be adjusted with other or additional pigments depending upon the desired end products. Fillers, such as limestone, are used to provide a dry foam which shows less blocking of cell wall to cell wall under a loading which may not recover and to provide a dry, free-flowing powder which will pack more closely and feed uniformly to give a uniform layup. The uniform foam end product is dependent upon the uniformity of mixing, the uniformity of the layup of the "dry blend" and the maximum blowing or decomposition of the blowing agent in the process.

In general, closed cells are made by using a lower molecular weight resin, a faster solvating plasticizer system, no activator, a fine particle size blowing agent, and a longer dwell time to produce a fused material before the peak of decomposition of the blowing agent is reached. Open cells are made preferably by using higher molecular weight resins, a slower solvating plasticizer system, an activator for earlier blowing, a larger particle size blowing agent which decomposes over a broader temperature range, and a shorter dwell time.

Other blowing agents may be used in the practice of this invention and include N,N' - dimethyl - N,N' - dinitroso terephthalamide (Nitrosan) of 4,4'-oxybis (benzene-sulfonyl hydrazide) (Celogen).

I claim:
1. The method of producing a decorative thermoplastic vinyl resin sheet having a plurality of distinct layers of fused and consolidated thermoplastic vinyl resin composition including at least one cellular layer comprising
    laying up a plurality of layers of a free-flowing thermoplastic vinyl resin mix on a carrier, said free-flowing mix being comprised of porous particles of unfused thermoplastic vinyl resin, liquid vinyl plasticizer, vinyl stabilizer, pigment and filler with each of said plurality of layers being of differing composition from adjacent layers and with at least one layer additionally containing a blowing agent, heating said layers to a temperature at which the resin particles fuse and become substantially fluid and at which the blowing agent decomposes, and extruding said layers between the carrier and a consolidating roll while the resin particles are substantially fluid and controlling the extrusion such that substantially no mixing occurs between adjacent layers.

2. The method in accordance with claim 1 in which the free-flowing mix containing the blowing agent is formed from, in relative proportions,

| | Parts by weight |
|---|---|
| Particles of an unfused thermoplastic vinyl resin | 100 |
| Plasticizer | 20 to 125 |
| Stabilizer | 2 to 6 |
| Blowing agent | 0.5 to 7 |
| Filler and pigment | 0 to 50 |

3. The method in accordance with claim 1 in which the resin particles are particles of a vinyl chloride homopolymer having a specific viscosity in the range of about 0.15 to 0.6.

4. The method in accordance with claim 2 in which the resin particles are particles of a vinyl chloride homopolymer having a specific viscosity in the range of about 0.15 to 0.6.

References Cited
UNITED STATES PATENTS

| 3,012,901 | 12/1961 | Reese | 264—112 XR |
| 3,024,948 | 3/1962 | Rabl | 264—125 XR |
| 3,192,294 | 6/1965 | Streed et al. | 264—54 |

JAMES A. SEIDLECK, *Primary Examiner.*

P. E. ANDERSON, *Assistant Examiner.*